United States Patent
Lee et al.

(10) Patent No.: US 7,435,761 B2
(45) Date of Patent: *Oct. 14, 2008

(54) MICROPOROUS POLYETHYLENE FILM AND METHOD OF PRODUCING THE SAME

(75) Inventors: Young Keun Lee, Daejeon (KR); Jang Weon Rhee, Daejeon (KR); Won Young Cho, Daejeon (KR); Jung Moon Sung, Seoul (KR); Byoung Cheon Jo, Daejeon (KR); Chol Ho Lee, Daejeon (KR); In Hwa Jung, Daejeon (KR); Byung Rae Jung, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 181 days.

This patent is subject to a terminal disclaimer.

(21) Appl. No.: 10/943,997

(22) Filed: Sep. 20, 2004

(65) Prior Publication Data

US 2006/0009538 A1    Jan. 12, 2006

(30) Foreign Application Priority Data

Jul. 6, 2004   (KR) ............... 10-2004-0052339
Sep. 14, 2004  (KR) ............... 10-2004-0073452

(51) Int. Cl.
    *C08J 5/22*  (2006.01)
(52) U.S. Cl. .............. 521/61; 521/64; 521/62; 521/142; 521/143
(58) Field of Classification Search ........... 521/61, 521/62, 64, 142, 143
See application file for complete search history.

(56) References Cited

U.S. PATENT DOCUMENTS

| | | | |
|---|---|---|---|
| 4,247,498 A | 1/1981 | Castro | |
| 4,335,193 A | 6/1982 | Doi | |
| 4,539,256 A | 9/1985 | Shipman | |
| 4,588,633 A | 5/1986 | Kono et al. | |
| 4,778,601 A | 10/1988 | Lopatin et al. | |
| 4,873,034 A | 10/1989 | Kono et al. | |
| 4,877,679 A | 10/1989 | Leatherman et al. | |
| 5,015,521 A | 5/1991 | Fujii et al. | |
| 5,051,183 A | 9/1991 | Takita et al. | |
| 5,288,762 A * | 2/1994 | Park et al. ............ 521/79 |
| 5,411,351 A | 5/1995 | Lasch et al. | |
| 5,641,565 A | 6/1997 | Sogo | |
| 5,643,511 A | 7/1997 | Pluyter et al. | |
| 5,683,634 A | 11/1997 | Fujii et al. | |
| 5,759,678 A | 6/1998 | Fujii et al. | |
| 5,786,396 A | 7/1998 | Takita et al. | |
| 5,830,554 A | 11/1998 | Kaimai et al. | |
| 6,096,213 A * | 8/2000 | Radovanovic et al. .. 210/500.36 |
| 6,127,438 A | 10/2000 | Hasegawa et al. | |
| 6,245,272 B1 | 6/2001 | Takita et al. | |
| 6,566,012 B1 | 5/2003 | Takita et al. | |

FOREIGN PATENT DOCUMENTS

| | | |
|---|---|---|
| JP | 01-167344 | 7/1989 |
| JP | 03-245457 | 11/1991 |
| JP | 06-212006 | 8/1994 |
| JP | 06-234876 | 8/1994 |
| JP | 09-003228 | 1/1997 |
| JP | 09-259858 | 10/1997 |
| JP | 2001-17100 | 1/2000 |
| JP | 2000-204188 | 7/2000 |
| JP | 2002-338730 | 11/2002 |
| JP | 2004-182763 | 7/2004 |
| JP | 2004-196871 | 7/2004 |

OTHER PUBLICATIONS

Encyclopedia of Polymer Science and Technology, "Antioxidants", J. Wiley $ Sons, 2004, vol. 4, pp. 179-208.*

* cited by examiner

*Primary Examiner*—Irina S Zemel
(74) *Attorney, Agent, or Firm*—Clark & Brody

(57) ABSTRACT

Disclosed is a microporous polyethylene film for a battery separator and a method of producing the same. The microporous polyethylene film comprises a resin mixture, which includes 100 parts by weight of composition containing 20-50 wt % polyethylene with a weight average molecular weight of $5 \times 10^4$-$3 \times 10^5$ (component I) and 80-50 wt % diluent (component II), 0.1-2 parts by weight of peroxide (component III), and 0.05-0.5 parts by weight of anti-oxidant (component IV). The microporous polyethylene film has a puncture strength of 0.22 N/μm or more and a gas permeability (Darcy's permeability constant) of $1.3 \times 10^{-5}$ Darcy or more. The present invention increases production efficiency of the microporous film, and improves performances and stability of the battery when the microporous polyethylene film is used in a battery separator.

6 Claims, No Drawings

MICROPOROUS POLYETHYLENE FILM AND METHOD OF PRODUCING THE SAME

BACKGROUND OF THE INVENTION

1. Field of the Invention

The present invention relates to a microporous polyethylene film and a method of producing the same. More particularly, the present invention pertains to a microporous polyethylene film, which has a high productivity due to a superior extrusion-compoundability, and which can improve performance and stability of a battery produced using the same, and a method of producing the same.

2. Description of the Prior Art

Having chemical stability and superior physical properties, a microporous polyolefin film is widely used as various battery separators, filters, and ultrafiltration membranes.

The production of the microporous film using polyolefin may be conducted according to the following three processes. In a first process, polyolefin is processed into a thin fiber to produce a nonwoven fabric-shaped microporous film, a second process is a dry process, in which a thick polyolefin film is prepared and stretched at low temperatures to create micro cracks between lamellas corresponding to a crystalline portion of polyolefin to form micro pores in polyolefin, and a third process is a wet process, in which polyolefin is compounded with a diluent at high temperatures to form a single phase, phase separation of polyolefin and diluent is initiated in a cooling step, and the diluent is extracted to form pores in polyolefin. In comparison with the first and second processes, the wet process, corresponding to the third process, produces a relatively thin microporous film with uniform thickness and excellent physical properties, and thus, the microporous film according to the wet process is widely used for an isolation membrane of a secondary battery, such as a lithium ion battery.

A method of producing a porous film according to a wet process is disclosed in U.S. Pat. No. 4,247,498, which comprises blending polyethylene and a compatible liquid with each other at high temperatures to form a thermodynamically homogeneous solution, and cooling the solution to initiate solid/liquid or liquid/liquid phase separation, thereby producing the porous polyolefin film.

U.S. Pat. No. 4,335,193 discloses a technology of producing a porous polyolefin film, which includes blending polyolefin, an organic liquid, such as dioctylphthalate and liquid paraffin, and inorganic filler; forming the blend; and removing the organic liquid and inorganic filler from the formed blend, which is also indicated by U.S. Pat. No. 5,641,565. However, the technology is disadvantageous in that the inorganic filler, such as silica, is used in compounding process, it is difficult to conduct feeding and compounding processes of the inorganic filler, and a subsequent process of extracting and removing the inorganic filler must be additionally conducted, and thus, the technology becomes very complicated and also it is difficult to increase a stretching ratio.

U.S. Pat. No. 4,539,256 recites a basic method of producing a microporous film, which includes extrusion molding a mixture of polyethylene and a compatible liquid, stretching the formed mixture, and extracting the compatible liquid from the stretched mixture.

In conjunction with the earnest use of a secondary battery, efforts have been continuously made to improve the productivity and physical properties of a microporous film. A representative example is to improve the strength of the microporous film by using ultra-high molecular weight polyolefin (UHMWPO) with a weight average molecular weight of about 1,000,000, or blending such a UHMWPO with a composition to increase a molecular weight of the composition.

With respect to this, U.S. Pat. Nos. 4,588,633 and 4,873,034 suggest a process of producing a microporous film, in which polyolefin with a weight average molecular weight of 500,000 or more and a diluent capable of dissolving polyolefin at high temperatures are subjected to two step solvent extraction and stretching steps. However, this process is disadvantageous in that in order to improve a poor compoundability of UHMWPO with diluent and a poor extrudability of UHMWPO, which are considered as disadvantages of UHMWPO, an excessive amount of diluent is used in an extruding step, and diluent must be extracted through two steps, before and after stretching.

Meanwhile, Japanese Pat. Laid-Open Publication No. Hei. 03-245457 suggests a technology to enhance stability and reliability of a battery, in which two or more fine porous membranes, made of polyolefin, are attached to each other and one of the fine porous membranes is made of crosslinked polyolefin.

Furthermore, Japanese Pat. Laid-Open Publication No. Hei. 01-167344 provides a process of producing a microporous film, which includes adding a crosslinking agent and a crosslinking aid into an organic solvent solution to form a blend, and crosslinking the blend through an extrusion process. However, the microporous polyolefin film is disadvantageous in that it is not fit to be used as a secondary battery because of poor tensile strength of 330 kg/cm$^2$ or less, it is difficult to control a viscosity of the blend in an extruder because polyethylene chains are bonded to each other due to a crosslink during an extrusion process, and it is difficult to produce a uniform gel-free film or sheet because of generation of gels.

U.S. Pat. No. 6,127,438 discloses a process of producing a microporous film, which includes forming a sheet made of polyethylene and a plasticizer, stretching the sheet, extracting the plasticizer, and irradiating the resulting sheet with an electron beam to crosslink the sheet, thereby increasing the strength of the microporous polyethylene film. However, this process is problematic in that since the process includes an additional electron beam irradiation step, safety is in question and production costs are undesirably increased.

Recently, there is a demand for a lithium ion battery, which assures a high capacity, excellent productivity and safety. In order to meet the demand, the prior arts as described above use a resin with a high molecular weight or adopt a crosslinking process to improve physical properties of a film and safety and reliability of the battery. However, use of the resin with the high molecular weight or addition of a crosslinking agent during an extrusion process may bring about problems, such as an increased extrusion load, a poor extrusion-compoundability of a resin with a diluent, an increased load of a stretcher during a stretching process, occurrence of non-uniform stretching, and a reduced productivity due to a decrease of a stretching speed and ratio, and may also lead to reduced safety and increased production costs due to use of radioactive substances in the case of crosslinking the film by irradiating the film with an electron beam after the film is formed.

The present inventors have conducted extensive studies to avoid the above disadvantages occurring in the prior arts, resulting in the finding that when peroxide is added to polyethylene with a low molecular weight and a mixture is then extruded, the molecular weight is increased during an extrusion process, thereby accomplishing the present invention.

SUMMARY OF THE INVENTION

Therefore, the present invention has been made keeping in mind problems caused by using high molecular weight resins and a crosslinking process, occurring in the prior arts, and an object of the present invention is to provide a microporous polyethylene film with excellent physical properties, which can be used as a microporous film in a battery, and which assures safety of the battery.

Another object of the present invention is to provide a method of economically producing a microporous polyethylene film with high productivity.

The above objects can be accomplished by providing a microporous polyethylene film, which comprises a resin mixture, including 100 parts by weight of a composition containing 20-50 wt % polyethylene with a weight average molecular weight of $5 \times 10^4$-$3 \times 10^5$ (component I) and 80-50 wt % diluent (component II); 0.1-2 parts by weight of peroxide (component III); and 0.05-0.5 parts by weight of anti-oxidant (component IV). In this regard, a puncture strength is 0.22 N/μm or more and a gas permeability (Darcy's permeability constant) is $1.3 \times 10^{-5}$ Darcy or more.

Furthermore, the present invention provides a method of producing a microporous polyethylene film, which comprises (a) melt-extruding a resin mixture to form a sheet; (b) stretching the sheet at a temperature range where 30-80 wt % of a crystalline portion of the sheet is molten, according to a tenter-type simultaneous stretching process such that stretching ratios are 3 times or more in machine and transverse directions, respectively and a total stretching ratio is 25-50 times, to produce a film; and (c) extracting the diluent from the film and heat-setting the resulting film. At this time, the resin mixture includes 100 parts by weight of composition containing 20-50 wt % polyethylene with a weight average molecular weight of $5 \times 10^4$-$3 \times 10^5$ (component I) and 80-50 wt % diluent (component II), 0.1-2 parts by weight of peroxide (component III), and 0.05-0.5 parts by weight of anti-oxidant (component IV). In this regard, the microporous polyethylene film has a puncture strength of 0.22 N/μm or more and a gas permeability of $1.3 \times 10^{-5}$ Darcy or more.

DETAILED DESCRIPTION OF THE INVENTION

Hereinafter, a detailed description will be given of the present invention.

According to the present invention, in the case of using a resin with a high molecular weight, when an extruder with a long residence time is used to improve extrusion-compoundability or an extrusion amount per time is reduced to increase compoundability, problems, such as increased investment costs and high production costs due to poor productivity, occurring in the prior arts are avoided, the production costs are reduced due to improved extrusion-compoundability, and it is possible to produce a microporous polyethylene film with excellent physical properties, which are the same as those of the film produced using the resin with the high molecular weight, using polyethylene with a relatively low molecular weight.

The method of producing the microporous polyethylene film using polyethylene according to the present invention is based on the following mechanism.

A low molecular weight organic material with a molecular structure similar to that of polyethylene (hereinafter, referred to as "diluent") forms a thermodynamically single phase in conjunction with polyethylene at high temperatures where polyethylene is molten. When a solution of polyethylene and diluent in the thermodynamically single phase state is cooled to room temperature, phase separation of polyethylene and diluent is initiated. In detail, the single phase is divided into a polyethylene rich phase mostly consisting of a lamella corresponding to a crystalline portion of polyethylene, and a diluent rich phase consisting of a small amount of polyethylene, dissolved in the diluent at room temperature, and the diluent. After the completion of the cooling, the diluent is extracted with an organic solvent to produce the microporous polyethylene film.

Accordingly, a basic structure of the microporous film depends on the process of the phase separation. In other words, a pore size and structure of the end microporous film depend on a size and a structure of the diluent rich phase formed through the phase separation. Additionally, the basic physical properties of the microporous film are influenced by a crystal structure of polyethylene.

Based on the above mechanism, the microporous polyethylene film according to the present invention is produced using a resin mixture, which includes 0.1-2 parts by weight of peroxide (component III) and 0.05-0.5 parts by weight of anti-oxidant (component IV) based on 100 parts by weight of composition, containing 20-50 wt % polyethylene with a weight average molecular weight of $5 \times 10^4$-$3 \times 10^5$ (component I) and 80-50 wt % diluent (component II). In detail, the resin mixture is melt-extruded to form a sheet, the sheet is stretched to form a film, the diluent is extracted from the film, and the resulting film is dried and heat-set to produce the microporous polyethylene film with puncture strength of 0.22 N/μm or more, gas permeability (Darcy's permeability constant) of $1.3 \times 10^5$ Darcy or more, and excellent extrusion-compoundability.

The present invention adopts a reactive extrusion technology using peroxide, such as 2,5-di(tert-butylperoxy)-2,5-dimethylhexane, di-tert-butyl-peroxide, and dicumyl-peroxide, to compound a resin with a relatively low molecular weight to produce a resin with a relatively high molecular weight.

Peroxide (component III) is decomposed in an extruder to generate active radicals, and the active radicals react with double bonds at chain ends of the polyethylene-based resin (component I) to link different chains to each other, thereby increasing the molecular weight of the polyethylene resin during such an extrusion process. In other words, in the case of extruding a resin composition, containing polyethylene, diluent, and peroxide, since such a compounding process is conducted while the molecular weight of the composition is maintained low at an early stage, it is possible to increase the compoundability and extrudability of the composition, and since the molecular weight of the composition is sufficiently increased at a final stage of the compounding process, it is possible to gain the same composition as in the case of using polyethylene with the high molecular weight. Accordingly, it is possible to produce the microporous film with excellent physical properties as well as improved compoundability and extrudability.

On the other hand, in the case of the composition containing polypropylene and the like having tertiary carbon, chains are broken at a point where tertiary carbon exists, and thus, its molecular weight is reduced. When polyethylene contains an α-olefin comonomer with tertiary carbon, chains are broken at tertiary carbon of the α-olefin comonomer. Hence, in the present invention, it is preferable to use polyethylene, containing 2 wt % or less α-olefin comonomer with 3-8 carbons, to prevent the reduction of the molecular weight due to the breaking of the chains.

Furthermore, it is preferable that the weight average molecular weight of polyethylene (component I) used in the present invention is $5 \times 10^4$-$3 \times 10^5$. When the weight average molecular weight of polyethylene is less than $5 \times 10^4$, it is difficult to sufficiently increase the molecular weight of polyethylene so as to produce the microporous film with excellent physical properties, and it is difficult to control the reaction of peroxide with polyethylene, so that gels are generated in case that an excessive amount of peroxide is added to polyethylene so as to gain the sufficient molecular weight. Additionally, offensive odors may occur because of unreacted peroxide, and discoloration (yellowing) may occur due to use of the excessive amount of peroxide. On the other hand, when the weight average molecular weight of polyethylene is more than $3 \times 10^5$, since the load of the extruder is increased due to an increase of viscosity during the extrusion process and the compoundability is reduced due to a large viscosity difference between polyethylene and the diluent, an improvement of the extrusion-compoundability by use of peroxide is hindered and a desirable effect is not assured.

Any organic liquid capable of forming the single phase in conjunction with the resin at an extrusion-compounding temperature may be used as the diluent of the present invention. Examples of the diluent include aliphatic or cyclic hydrocarbon, such as nonane, decane, decalin, and paraffin oil, and phthalic acid ester, such as dibutyl phthalate and dioctyl phthalate. Of them, paraffin oil, which is harmless to humans, has a high boiling point, and contains a small amount of volatile components, is preferable, and paraffin oil with a kinetic viscosity of 20-200 cSt at 40° C. is more preferable. When the kinetic viscosity of paraffin oil is more than 200 cSt, there may occur problems, such as the increased load and inferior surfaces of the sheet and film, because of the high kinetic viscosity in the extruding process, and since it is difficult to conduct the extraction process, the productivity may be reduced and the gas permeability may be reduced due to the remaining oil. On the other hand, when the kinetic viscosity of paraffin oil is less than 20 cSt, it is difficult to conduct compounding of paraffin oil with polyethylene melt in the extruder during the extrusion process because of a large viscosity difference between paraffin oil and polyethylene melt.

As for contents of polyethylene and diluent, it is preferable that the contents of polyethylene and diluent are 20-50 wt % and 80-50 wt %, respectively. When the content of polyethylene is more than 50 wt %, the porosity and pore size are reduced, and interconnection between pores is reduced, thereby largely reducing the gas permeability. On the other hand, when the content of polyethylene is less than 20 wt %, the compoundability of polyethylene with diluent is reduced, and thus, polyethylene is not thermodynamically blended with the diluent but extruded in a gel state, bringing about problems, such as breakage and a nonuniformity of thickness during the stretching process.

Examples of peroxide (component III) of the present invention may include peroxyester-based compounds, such as tert-butylperoxy pivalate (TBPP), tert-butylperoxy 2-ethylhexanoate (TBEH), and tert-butylperoxy benzoate (TBPB); diacyl peroxide-based compounds, such as dibenzoyl peroxide (BPO) and dilauroyl peroxide (LPO); dialkyl peroxide-based compounds, such as 1,1-di(tert-butylperoxy)-3,3,5-trimethylcyclohexane (BBTCH), 1,1-di(tert-butylperoxy)cyclohexane (BBCH), dicumyl peroxide (DCP), α,α'-di(tert-butylperoxy)diisopropylbenzene (DIPB), di-tert-butylperoxide (DBP), 2,5-di(tert-butylperoxy)-2,5-dimethylhexane (DTBH), and di(tert-butylperoxy)-2,5-dimethylhexyne (DTBHY); alkyl hydroperoxide-based compounds, such as tert-butyl hydroperoxide (TBHP) and cumyl hydroperoxide (CHP); and azo-based compounds, such as 2-phenylazo-2,4-dimethyl-4-methoxypentanenitrile.

A content of peroxide (component III) is preferably 0.1-2 parts by weight based on 100 parts by weight of mixed composition of polyethylene (component I) and the diluent (component II). When the content of peroxide is less than 0.1 parts by weight, it is difficult to gain the high molecular weight required to satisfy the desired physical properties of a separator. On the other hand, when the content of peroxide is more than 2 parts by weight, since peroxide is used in an excessive amount, it is difficult to control the reaction of peroxide with polyethylene, so that gels are generated, offensive odors may occur because of unreacted peroxide, and discoloration (yellowing) may occur due to use of the excessive amount of peroxide.

Examples of the anti-oxidant (component IV) used in the present invention include phenol-based compounds, such as tetrabis(methylene-3-(3,5-di-tert-butyl-4-hydroxyphenyl) propionate)methane, 2,6-di-tert-butyl-p-cresol, octadecyl-3-(4-hydroxy-3,5-di-tert-butylphenol)propionate, 1,3,5-trimethyl-2,4,6-tris-(3,5-di-tert-butyl-4-hydroxybenzyl) benzene, and tris-(3,5-di-tert-butyl-4-hydroxybenzyl) isoamine; amine-based compounds, such as phenyl-α-naphtylamine, phenyl-β-naphtylamine, N,N'-diphenyl-p-phenylenediamine, and N,N'-di-β-naphtyl-p-phenylenediamine; phosphite-based compounds, such as tris (2,4-di-tert-butylphenyl)phosphite and di(2,4-di-tert-butylphenyl)-pentaerythritol diphosphite; and thioester-based compounds, such as dilauryl sulfide, dilauryl thiodipropionate, distearyl thiodipropionate, metacaptobenzothioazole, and tetramethylthiuram disulfide.

It is preferable that a content of the anti-oxidant (component IV) is 0.05-0.5 parts by weight based on 100 parts by weight of mixed composition of polyethylene (component I) and diluent (component II). When the content of the anti-oxidant is less than 0.05 parts by weight, since the chains of polyethylene are broken due to a high shear force occurring in the melt-extrusion process, the molecular weight of polyethylene is reduced even though peroxide is added to polyethylene, and when the content of the anti-oxidant is more than 0.5 parts by weight, an increasing effect of the molecular weight of polyethylene by use of peroxide is reduced and production costs are undesirably increased.

Additives, such as an UV stabilizer and an antistatic agent, may be further added to the mixed composition so as to improve specific functions of the composition.

The mixed composition is melt-extruded using a twin screw compounder, a kneader, or a Banbury mixer, designed so as to be used to mix polyethylene with the diluent, to produce the sheet. Polyethylene, peroxide, and an antioxidant should be fed into the compounder after they are thoroughly blended with each other, but the diluent may be fed into the compounder after it is previously blended with them or it may be fed into the compounder through separate feeder. A melt-extrusion temperature is preferably 200-250° C. If the melt-extrusion temperature is lower than 200° C., an effect of peroxide is reduced because a reaction of peroxide is insufficiently conducted during the extrusion process, and offensive odors may occur because of unreacted peroxide. If the melt-extrusion temperature is higher than 250° C., reduction of the molecular weight of polyethylene and discoloration may be caused by a thermal oxidation.

Both casting and calendering processes may be applied to produce the sheet using the melt.

It is preferable that the stretching process is conducted in a tenter-type simultaneous stretching manner. If the stretching process is conducted in a roll-type stretching manner, defects, such as scratches, may be formed on a surface of the sheet during the stretching process. At this time, it is preferable that the stretching ratios are 3 times or more in machine and transverse directions, respectively and a total stretching ratio is 25-50 times. When the stretching ratio is less than 3 times in any direction, orientation is poor in such direction and a balance between physical properties in the machine and transverse directions is upset, and thus, the tensile and puncture strengths are reduced. Additionally, when the total stretching ratio is less than 25 times, non-uniform stretching occurs, and when the total stretching ratio is more than 50 times, a breakage may occur during the stretching process and the shrinkage of the end film is undesirably increased.

In this respect, the stretching temperature depends on a melting point of polyethylene, a concentration and a kind of the diluent. The optimum stretching temperature is preferably selected from a temperature range where 30-80 wt % of the crystalline portion of polyethylene in the sheet is molten. When the stretching temperature is lower than a temperature where 30 wt % of the crystalline portion of polyethylene in the film sheet is molten, softness of the sheet is poor to have the enough stretchability of the film, and thus, there is a fair possibility of the breakage during the stretching process and the non-uniform stretching also simultaneously occurs. On the other hand, when the stretching temperature is higher than a temperature where 80 wt % of the crystalline portion is molten, the stretching process is easily conducted and the occurrence of the non-uniform stretching is reduced, but the deviation of thickness occurs due to a partial over-stretching and the physical properties of the film are significantly reduced because an orientation effect of the resin is low. Meanwhile, the melting of the crystalline portion of polyethylene according to the stretching temperature may be evaluated by a differential scanning calorimeter (DSC) analysis for the film.

The stretched film is extracted with the organic solvent and dried. Non-limiting, illustrative examples of the available organic solvent of the present invention may include any solvent capable of extracting the diluent used to extrude the resin, and preferably, methyl ethyl ketone, methylene chloride, and hexane, which have a high extraction efficiency and are rapidly dried. The extraction may be conducted according to a typical solvent extracting process, in detail, any one process or a combination of immersion, solvent spray, and ultrasonic processes. The amount of the remaining diluent must be 1 wt % or less after the extraction process. When the amount of the remaining diluent is more than 1 wt %, the physical properties and the gas permeability of the film are reduced.

The dried film is heat-set to remove a residual stress and thus to reduce the shrinkage of the end film. According to a heat-setting process, the film is set and then heated to forcibly maintain an original shape of the film, to be shrunken, to remove the remaining stress. It is desirable that a heat-setting temperature is high in order to reduce the shrinkage of the film, but when the heat-setting temperature is very high, a portion of the film is molten to block micro pores, thereby reducing the gas permeability. The desirable heat-setting temperature is selected from a temperature range where 10-30 wt % of the crystalline portion of the film is molten. When the heat-setting temperature is lower than a temperature where 10 wt % of the crystalline portion of the film is molten, reorientation of polyethylene molecules in the film is poor, and thus, residual stress removal efficiency from the film is trivial, and when the heat-setting temperature is higher than a temperature where 30 wt % of the crystalline portion of the film is molten, the film is partially molten to block the micro pores, and thus the gas permeability is reduced. Preferably, a heat-setting time is 1-20 min.

The microporous polyethylene film produced according to the present invention as described above has the following physical properties.

(1) The puncture strength is 0.22 N/µm or more.

When the microporous film is applied to the battery separator, if the microporous film has the insufficient puncture strength, defined as the strength of the film against a sharp substance, the film may be torn due to an abnormal surface state of electrodes or dendrites formed on surfaces of the electrodes in use of the battery, and thus, a short may occur. When a break point is 350 g or less, a commercial battery separator is problematic in that safety is reduced due to the occurrence of the short. Among films for the general commercial battery separator, the film with the puncture strength of 0.22 N/µm or more according to the present invention is the thinnest 16 µm, and has the break point of 350 g or more in use, thus safely being applied to many fields.

(2) The gas permeability (Darcy's permeability constant) is $1.3 \times 10^{-5}$ Darcy or more.

When the gas permeability is $1.3 \times 10^{-5}$ Darcy or less, efficiency of the microporous film is significantly reduced. Particularly, when the gas permeability is less than $1.3 \times 10^{-5}$ Darcy, in case that the microporous film is applied to the battery separator, charging and discharging characteristics of the battery are poor and a lifetime of the battery is reduced. However, the film with the gas permeability of $1.3 \times 10^{-5}$ Darcy or more according to the present invention gives the battery the excellent charging and discharging characteristics and low temperature characteristics, and serves to improve the lifetime of the battery.

In addition to the above physical properties, the microporous polyethylene film of the present invention has the excellent extrusion-compoundability and battery stability.

Having generally described this invention, a further understanding can be obtained by reference to certain specific examples and comparative examples which are provided herein for purposes of illustration only and are not intended to be limiting unless otherwise specified.

A molecular weight of polyethylene was measured using a high temperature gel permeation chromatography (GPC), manufactured by Polymer Laboratory Inc.

A viscosity of a diluent was measured using CAV-4 automatic viscometer, manufactured by Cannon Instrument Co.

Dialkylperoxide-based compound, 2,5-di(tert-butylperoxy)2,5-dimethyl hexane was used as peroxide.

Tetrabis(methylene-3-(3,5-di-tert-butyl-4-hydroxyphenyl)propionate)methane as a phenol-based anti-oxidant and tris(2,4-di-tert-butylphenyl)phosphite as a phosphite-based anti-oxidant, mixed with each other in a 1:1 ratio, were used as an anti-oxidant.

A mixture of polyethylene, diluent, peroxide, and anti-oxidant was compounded using a twin screw compounder in which φ was 30 mm and L/D was 40:1. The mixture was fed through a hopper after components of the mixture were previously blended, and peroxide was diluted with acetone by 20 times to improve dispersibility of peroxide in the mixture and then blended with other components of the mixture. Melt-extrusion temperature was 200-240° C., rotation speed of screws was 200 rpm, and the extrusion-compoundability was estimated by measuring the number of gels, generated due to the poor compounding, while changing an amount of extrudate. In order to evaluate the extrusion-compoundability, the extrudate extruded using a T-shaped die was shaped into a sheet with a thickness of 200 μm using a casting roll, and the number of gels in the sheet with an area of 2000 cm² was counted. The number of the gels had to be 50 or less per 2000 cm² to prevent a quality of a microporous film from being reduced, and thus, a maximum extrusion rate when the number of the gels was 50 or less per 2000 cm² was measured, and the number of the gels per 2000 cm² was counted when the extrusion amount per time was 10 kg/hr. The results are described in Table 1.

The resulting mixture was extruded using the above T-shaped die at the extrusion rate of 10 kg/hr into the sheet with a thickness of 600-1200 μm, to be stretched.

The formed sheet was analyzed using a DSC to evaluate the melting of a crystalline portion thereof with an increase of a temperature. Analysis conditions included a sample weight of 5 mg and a scanning rate of 10° C./min.

A stretching process of the sheet was conducted in a simultaneous stretching manner using a tenter-type lab stretcher while a stretching ratio, temperature, and speed were varied, and the stretching temperature was determined at a temperature range where 30-80 wt % of a crystalline portion of polyethylene in the sheet was molten based on the analysis results of the DSC.

The extraction of the diluent was conducted with methylene chloride in an immersion process for 6 min.

After the film, from which the diluent was extracted, was dried under atmospheric air, the dried film was set to a frame and then left in a convection oven at 120° C. for 90 sec, thereby completing a heat-setting process.

Puncture strength and gas permeability, which were considered to be the most important physical properties of the microporous film, of the resulting film were measured, and the results are described in Table 1.

Measurement of the physical properties (1) The puncture strength was determined by measuring strength of the film when the film was punctured by a pin with a diameter of 0.5 mm moving at a speed of 120 mm/min (2) The gas permeability was measured using a porometer (CFP-1500-AEL manufactured by PMI Co. Ltd.). Conventionally, the gas permeability was expressed by a Gurley number, but since an effect of a thickness of the film was not reflected in the Gurley number, it was difficult to gain a relative permeability to a pore structure of the film. To avoid the above disadvantage, in the present invention, a Darcy's permeability constant was used. The Darcy's permeability constant was calculated by the following Equation 1, and nitrogen was used as gas in the present invention.

$$C = (8FTv)/(\pi D^2(P^2-1))$$ Equation 1 wherein, C is the Darcy's permeability constant, F is a flow rate, T is a sample thickness, V is a viscosity of the gas (0.185 for $N_2$), D is a sample diameter, and P is pressure.

An average value of Darcy's permeability constants at a range of 100-200 psi was used in the present invention.

EXAMPLE 1

Polyethylene with a weight average molecular weight of $3 \times 10^5$, containing no comonomer, was used as a component I, and a paraffin oil with a kinetic viscosity of 95 cSt at 40° C. was used as a component II. Contents of the component I and the component II were 30 wt % and 70 wt %, respectively. 0.7 parts by weight of component III and 0.4 parts by weight of component IV were used based on 100 parts by weight of mixed composition of components I and II.

A stretching process was conducted at a temperature of 115° C. where 30% of the crystalline portion of polyethylene was molten. A stretching ratio was 25 times (MD×TD=5×5).

EXAMPLE 2

Polyethylene with a weight average molecular weight of $5 \times 10^4$, containing no comonomer, was used as a component I, and a paraffin oil with a kinetic viscosity of 120 cSt at 40° C. was used as a component II. Contents of the component I and the component II were 40 wt % and 60 wt %, respectively. 2 parts by weight of component III and 0.2 parts by weight of component IV were used based on 100 parts by weight of mixed composition of components I and II.

A stretching process was conducted at a temperature of 119° C. where 50% of the crystalline portion of polyethylene was molten. A stretching ratio was 36 times (MD×TD=6×6).

EXAMPLE 3

Polyethylene with a weight average molecular weight of $3 \times 10^5$, containing no comonomer, was used as a component I, and a paraffin oil with a kinetic viscosity of 120 cSt at 40° C. was used as a component II. Contents of the component I and the component II were 40 wt % and 60 wt %, respectively. 1 parts by weight of component III and 0.2 parts by weight of component IV were used based on 100 parts by weight of mixed composition of components I and II.

A stretching process was conducted at a temperature of 118° C. where 40% of the crystalline portion of polyethylene was molten. A stretching ratio was 49 times (MD×TD=7×7).

EXAMPLE 4

Polyethylene with a weight average molecular weight of $3 \times 10^5$, containing no comonomer, was used as a component I, and a paraffin oil with a kinetic viscosity of 30 cSt at 40° C. was used as a component II. Contents of the component I and the component II were 20 wt % and 80 wt %, respectively. 0.3 parts by weight of component m and 0.1 parts by weight of component IV were used based on 100 parts by weight of mixed composition of components I and II.

A stretching process was conducted at a temperature of 117° C. where 40% of the crystalline portion of polyethylene was molten. A stretching ratio was 36 times (MD×TD=6×6).

EXAMPLE 5

Polyethylene with a weight average molecular weight of $2.5 \times 10^5$, containing 1.5 wt % butene-1 as a comonomer, was used as a component I, and a paraffin oil with a kinetic viscosity of 95 cSt at 40° C. was used as a component II. Contents of the component I and the component II were 30 wt % and 70 wt %, respectively. 0.5 parts by weight of component III and 0.5 parts by weight of component IV were used based on 100 parts by weight of mixed composition of components I and II.

A stretching process was conducted at a temperature of 114° C. where 30% of the crystalline portion of polyethylene was molten. A stretching ratio was 36 times (MD×TD=6×6).

COMPARATIVE EXAMPLE 1

Polyethylene with a weight average molecular weight of $5.7 \times 10^5$, containing 0.8 wt % butene-1 as a comonomer, was used as a component I, and a paraffin oil with a kinetic viscosity of 10 cSt at 40° C. was used as a component II.

Contents of the component I and the component II were 30 wt % and 70 wt %, respectively. A component III was not used, and 0.2 parts by weight of component IV was used based on 100 parts by weight of mixed composition of components I and II.

A stretching process was conducted at a temperature of 114.5° C. where 30% of the crystalline portion of polyethylene was molten. A stretching ratio was 36 times (MD×TD=6×6).

COMPARATIVE EXAMPLE 2

Polyethylene with a weight average molecular weight of $2.5×10^5$, containing 1.5 wt % butene-1 as a comonomer, was used as a component I, and a paraffin oil with a kinetic viscosity of 95 cSt at 40° C. was used as a component II. Contents of the component I and the component II were 30 wt % and 70 wt %, respectively. A component III was not used, and 0.4 parts by weight of component IV was used based on 100 parts by weight of mixed composition of components I and II.

A stretching process was conducted at a temperature of 116° C. where 40% of the crystalline portion of polyethylene was molten. A stretching ratio was 36 times (MD×TD=6×6).

COMPARATIVE EXAMPLE 3

Polyethylene with a weight average molecular weight of $3×10^5$, containing no comonomer, was used as a component I, and a paraffin oil with a kinetic viscosity of 95 cSt at 40° C. was used as a component II. Contents of the component I and the component II were 40 wt % and 60 wt %, respectively. 2.5 parts by weight of component III and 0.4 parts by weight of component IV were used based on 100 parts by weight of mixed composition of components I and II.

A stretching process was conducted at a temperature of 115° C. where 30% of the crystalline portion of polyethylene was molten. A stretching ratio was 25 times (MD×TD=5×5).

COMPARATIVE EXAMPLE 4

Polyethylene with a weight average molecular weight of $4.7×10^5$, containing no comonomer, was used as a component I, and a paraffin oil with a kinetic viscosity of 120 cSt at 40° C. was used as a component II. Contents of the component I and the component II were 60 wt % and 40 wt %, respectively. A component III was not used, and 0.2 parts by weight of component IV was used based on 100 parts by weight of mixed composition of components I and II.

A stretching process was conducted at a temperature of 116° C. where 20% of the crystalline portion of polyethylene was molten. A stretching ratio was 36 times (MD×TD=6×6).

COMPARATIVE EXAMPLE 5

Polyethylene with a weight average molecular weight of $3×10^5$, containing no comonomer, was used as a component I, and a paraffin oil with a kinetic viscosity of 30 cSt at 40° C. was used as a component II. Contents of the component I and the component II were 50 wt % and 50 wt %, respectively. 2 parts by weight of component III was used based on 100 parts by weight of mixed composition of components I and II, and a component IV was not used.

A stretching process was conducted at a temperature of 118° C. where 40% of the crystalline portion of polyethylene was molten. A stretching ratio was 36 times (MD×TD=6×6).

COMPARATIVE EXAMPLE 6

Polyethylene with a weight average molecular weight of $3×10^4$, containing no comonomer, was used as a component I, and a paraffin oil with a kinetic viscosity of 95 cSt at 40° C. was used as a component II. Contents of the component I and the component II were 30 wt % and 70 wt %, respectively. 2 parts by weight of component III and 0.2 parts by weight of component IV were used based on 100 parts by weight of mixed composition of components I and II.

A stretching process was conducted at a temperature of 124° C. where 85% of the crystalline portion of polyethylene was molten. A stretching ratio was 16 times (MD×TD=4×4).

TABLE 1

| Production condition | | Unit | Examples 1 | 2 | 3 | 4 | 5 |
|---|---|---|---|---|---|---|---|
| Polyethylene (component I) | Mw | G/mol | $3×10^5$ | $5×10^4$ | $3×10^5$ | $3×10^5$ | $2.5×10^5$ |
| | Comonomer | wt % | 0 | 0 | 0 | 0 | 1.5 |
| | Content | wt % | 30 | 40 | 40 | 20 | 30 |
| Paraffin oil (component II) | Viscosity(° C.) | cSt | 95 | 120 | 120 | 30 | 95 |
| | Content | wt % | 70 | 60 | 60 | 80 | 70 |
| Peroxide (component III) | Content | *Parts by weight | 0.7 | 2 | 1 | 0.3 | 0.5 |
| Anti-oxidant (component IV) | Content | *Parts by weight | 0.4 | 0.2 | 0.2 | 0.1 | 0.5 |
| Maximum extrusion rate | | kg/hr | 14 | 15.5 | 16.5 | 12 | 17 |
| The number of gels(10 kg/hr) | | #/2000 cm² | 9 | 14 | 10 | 5 | 7 |
| Surface of a sheet(10 kg/hr) | | — | Fine | Fine | Fine | Fine | Fine |
| Stretching | Temperature | ° C. | 115 | 119 | 118 | 117 | 114 |
| | Melting of a crystalline portion | % | 30 | 50 | 40 | 40 | 30 |
| | Ratio (MD × TD) | ratio | 5 × 5 | 6 × 6 | 7 × 7 | 6 × 6 | 6 × 6 |
| Thickness of a film | | μm | 22 | 20 | 19 | 19 | 21 |
| Puncture strength | | N/μm | 0.22 | 0.22 | 0.25 | 0.22 | 0.23 |
| Gas permeability | | $10^{-5}$ × Darcy | 1.8 | 1.7 | 1.3 | 1.9 | 1.4 |

*Parts by weight: based on 100 parts by weight of composition of the components I and II

TABLE 2

| Production condition | | Unit | Comparative examples | | | | | |
|---|---|---|---|---|---|---|---|---|
| | | | 1 | 2 | 3 | 4 | 5 | 6 |
| Polyethylene (component I) | Mw | g/mol | $5.7 \times 10^5$ | $2.5 \times 10^5$ | $3 \times 10^5$ | $4.7 \times 10^5$ | $3 \times 10^5$ | $3 \times 10^4$ |
| | Comonomer Content | wt % | 0.8 | 1.5 | 0 | 0 | 0 | 0 |
| | Content | wt % | 30 | 30 | 40 | 60 | 50 | 30 |
| Paraffin oil (component II) | Viscosity(° C.) | cSt | 10 | 95 | 95 | 120 | 30 | 95 |
| | Content | wt % | 70 | 70 | 60 | 40 | 50 | 70 |
| Peroxide (component III) | Content | *Parts by weight | — | — | 2.5 | — | 2 | 2 |
| Anti-oxidant (component IV) | Content | *Parts by weight | 0.2 | 0.4 | 0.4 | 0.2 | — | 0.2 |
| Maximum extrusion rate | | kg/hr | 7.5 | 17 | 8.5 | 9 | 14 | 16 |
| The number of gels(10 kg/hr) | | #/2000 cm² | 95 | 6 | 60 | 65 | 12 | 9 |
| Surface of a sheet(10 kg/hr) | | — | Bad | Fine | Bad | Bad | Fine | Fine |
| Stretching | Temperature | ° C. | 114.5 | 116 | 115 | 116 | 118 | 124 |
| | Melting of a crystalline portion | % | 30 | 40 | 30 | 20 | 40 | 85 |
| | Ratio (MD × TD) | ratio$_\lambda$ | 6 × 6 | 6 × 6 | 5 × 5 | 6 × 6 | 6 × 6 | 4 × 4 |
| Thickness of a film | | μm | 19 | 20 | 21 | 18 | 19 | 19 |
| Puncture strength | | N/μm | 0.22 | 0.15 | 0.18 | 0.27 | 0.15 | 0.10 |
| Gas permeability | | $10^{-5}$ × Darcy | 1.4 | 1.5 | 1.3 | 0.8 | 0.9 | 1.7 |

*Parts by weight: based on 100 parts by weight of composition of the components I and II As described above, the present invention is advantageous in that a melt-extrusion process is easily conducted, and thus, it is possible to stably produce a microporous polyethylene film of the present invention and the productivity is improved, and that since the microporous polyethylene film has excellent puncture strength, gas permeability, it can be used in a battery separator and various filters.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method of producing a microporous polyethylene film without the use of irradiation for the purpose of crosslinking, comprising:
   (a) melt-extruding a resin mixture to form a sheet, the resin mixture comprising:
      100 parts by weight of composition containing 20-50 wt % polyethylene with a weight average molecular weight of $5 \times 10^4$-$3 \times 10^5$ (component I) and 80-50 wt % diluent (component II);
      0.1-2 parts by weight of peroxide (component III); and
      0.05-0.5 parts by weight of anti-oxidant (component IV),
   (b) stretching the sheet at a temperature range, where 30-80 wt % of a crystalline portion of the sheet is molten, according to a tenter-type simultaneous stretching manner such that stretching ratios are 3 times or more in machine and transverse directions, respectively and a total stretching ratio is 25-50 times to produce a film; and
   (c) extracting the diluent from the film, and heat-setting the resulting film, wherein, the microporous polyethylene film has gels of 50 or less per a thickness of 200 μm and area of 2000 cm², a puncture strength of 0.22 N/μm or more and a gas permeability of 1.3 Darcy or more.

2. The method as set forth in claim 1, wherein the component I contains 2 wt % or less α-olefin comonomer with 3-8 carbons.

3. The method as set forth in claim 1, wherein the component II includes a paraffin oil with a kinetic viscosity of 20-200 cSt at 40° C.

4. The method as set forth in claim 1, wherein the component III is selected from the group consisting of a peroxyester-based compound, a diacyl peroxide-based compound, a dialkyl peroxide-based compound, an alkyl hydroperoxide-based compound, an azo-based compound, and a mixture thereof.

5. The method as set forth in claim 1, wherein the component IV is selected from the group consisting of a phenol-based compound, an amine-based compound, a phosphite-based compound, a thioester-based compound, and a mixture thereof.

6. The method as set forth in claim 1, wherein a melt-extrusion temperature is 200-250° C. in the step of (a).

* * * * *